(12) United States Patent
Gamard et al.

(10) Patent No.: US 7,237,570 B2
(45) Date of Patent: Jul. 3, 2007

(54) GAS CYLINDER DISPENSING VALVE

(75) Inventors: Stephan C. F. Gamard, Kenmore, NY (US); Bryan R. Bilec, Hamburg, NY (US); Gregory B. Eytchison, Huron, OH (US); Joe Quest, Ridgeville, OH (US); Anthony R. Polakowski, Avon Lake, OH (US); Jeffrey A. Smalheer, Parma, OH (US); Jay R. Varady, Medina, OH (US); William C. Wido, Avon, OH (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 11/504,952

(22) Filed: Aug. 16, 2006

(65) Prior Publication Data
US 2007/0062585 A1    Mar. 22, 2007

Related U.S. Application Data

(63) Continuation-in-part of application No. 10/947,212, filed on Sep. 23, 2004, now abandoned.

(51) Int. Cl.
*F16K 21/00* (2006.01)
(52) U.S. Cl. ............ 137/613; 137/614.11; 137/614.19; 137/556

(58) Field of Classification Search ................. 137/613, 137/505.25, 614.19, 614.11, 556; 251/251
See application file for complete search history.

(56) References Cited

U.S. PATENT DOCUMENTS

| 4,655,246 | A | * | 4/1987 | Phlipot et al. | ............... | 137/613 |
| 5,566,713 | A | * | 10/1996 | Lhomer et al. | .............. | 137/613 |
| 5,996,625 | A | * | 12/1999 | Collado et al. | ......... | 137/614.19 |
| 6,782,918 | B2 | * | 8/2004 | Rousselin | .................... | 137/613 |
| 7,007,714 | B2 | * | 3/2006 | Carroll | ........................ | 137/613 |

* cited by examiner

*Primary Examiner*—Kevin Lee
(74) *Attorney, Agent, or Firm*—Robert J. Hampsch (57) ABSTRACT

A gas cylinder dispensing valve having an internal flow path provided with a pressure regulator. An isolation valve is provided within the flow path between the pressure regulator and a gas inlet of the valve and a flow control valve is provided within the flow path between the pressure regulator and a gas outlet to discharge the gas. Both isolation valve and the flow control valve can be manipulated by a single control knob which when set in an off position closes the isolation valve. The control knob can be rotated from the off position to select discrete, calibrated flow rates or an auxiliary position in which gas may be dispensed at a regulated pressure from an auxiliary outlet port.

20 Claims, 11 Drawing Sheets

GAS CYLINDER DISPENSING VALVE

CROSS REFERENCE TO RELATED APPLICATIONS

The present application is a continuation-in-part to U.S. patent application Ser. No. 10/947,212 filed Sep. 23, 2004, now abandoned, the contents of which are incorporated by reference herein.

FIELD OF THE INVENTION

The present invention relates to a gas dispensing valve for dispensing gas from a compressed gas cylinder. More particularly, the present invention relates to such a gas cylinder dispensing valve in which a flow control valve is provided to adjust the flow rate of the gas to be dispensed and an isolation valve is provided to cut off the flow of gas. More particularly, the present invention relates to such a gas cylinder dispensing valve in which a single control knob adjusts the flow control valve and activates the isolation valve.

BACKGROUND OF THE INVENTION

Industrial gases such as those obtained from the fractionation of air, can be delivered and utilized with the use of portable compressed gas cylinders. For instance, hospitals routinely use portable gas cylinders containing breathable compressed gases for patients during the course of their stay. The gas cylinder is normally connected to a pressure regulator to reduce the pressure of the gas and a flow meter to control the flow of the gas to the patient.

Gas cylinder dispensing valves have been introduced that incorporate a pressure regulator and a flow control valve within a valve body. The valve body is designed to be connected to a gas cylinder containing the breathable gas to be dispensed for patient uses. The primary problem with the use of such dispensing valves is the tendency of the valve to leak between its filling and usage. This is mostly due to temperature shrinkage of different materials utilized within the valves.

In order to overcome this problem, U.S. Pat. No. 5,996,625 provides a dispensing valve that incorporates an isolation valve that can be set to cut off the flow of the gas within the valve. The device illustrated in this patent incorporates an isolation valve set transversely to the axis of rotation of control knobs that are located at the top of the body of the valve. The isolation valve is not biased and is toggled between open and closed positions by force applied to opposite ends of the valve that protrude from the valve body. The isolation valve is activated by a control knob having a tubular member covering the valve and provided with an internal cam-like surface to contact opposite ends of the valve to toggle the isolation valve. A top portion of the control knob is recessed to contain a separate control knob to adjust a flow control valve and therefore the gas flow rate of the gas to be dispensed. Hence, setting the valve in open and closed positions and adjusting the flow rate requires two separate motions by manipulation of the two control knobs.

As will be discussed, the present invention provides a gas cylinder dispensing valve having both a flow control valve and an isolation valve that are both manipulated by a single control knob. This simplifies the setting of the valve. Moreover, the present invention allows the dispensing valve to be constructed in a manner that is straight forward and thus, far less complicated than prior art designs.

SUMMARY OF THE INVENTION

The present invention may be characterized as a gas cylinder dispensing system or a gas cylinder dispensing valve for dispensing a gas from a compressed gas cylinder. The disclosed gas cylinder dispensing valve comprises a body of the valve configured to couple with an open head portion of a gas cylinder. The body has an internal flow path communicating between a gas inlet and a gas outlet. A pressure regulator regulates gas pressure of a flow of the gas within the internal flow path and an isolation valve is positioned within the internal flow path, between the gas inlet and the pressure regulator. The isolation valve is disposed within the body and is actuated between a closed position and an open position. Additionally, a flow control valve is positioned within the internal flow path, between the pressure regulator and the gas outlet, to control flow rate of the flow of the gas. The flow control valve has a rotating control shaft projecting from the body to adjust the flow control valve, wherein rotation of the control knob causes the isolation valve to move between the closed position and the open position and in addition, the control knob adjusts the flow control valve and therefore controls the flow of the gas.

Thus, in the present invention, the control knob is able to adjust both the flow of the gas to be dispensed and to actuate the isolation valve. As such, the operation of a gas cylinder dispensing valve is simpler than prior art designs that utilize two knobs for such purposes. Additionally, the use of an integrated isolation valve allows the entire dispensing valve to be constructed with less separate moving parts. Other advantages of the present invention will become apparent from the following discussion.

BRIEF DESCRIPTION OF THE DRAWINGS

While the specification concludes with claim distinctly pointing out the subject matter that applicants regard as their invention, it is believed that the invention will be better understood when taken in connection with accompanying drawings in which:

DETAILED DESCRIPTION

Figure 1A:
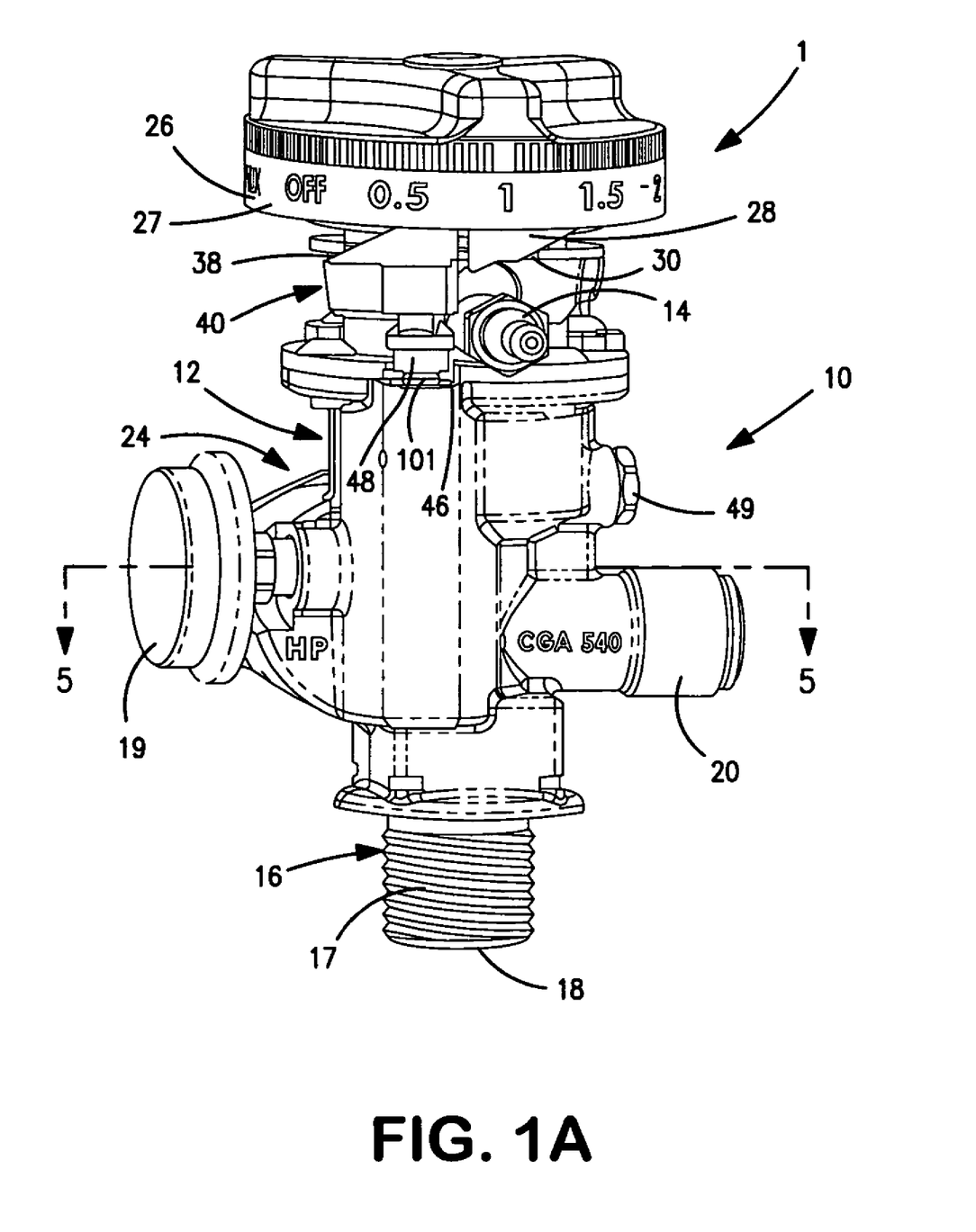
FIG. 1 is a front perspective view of an embodiment of the gas cylinder dispensing valve in accordance with the present invention.
Figure 1B:
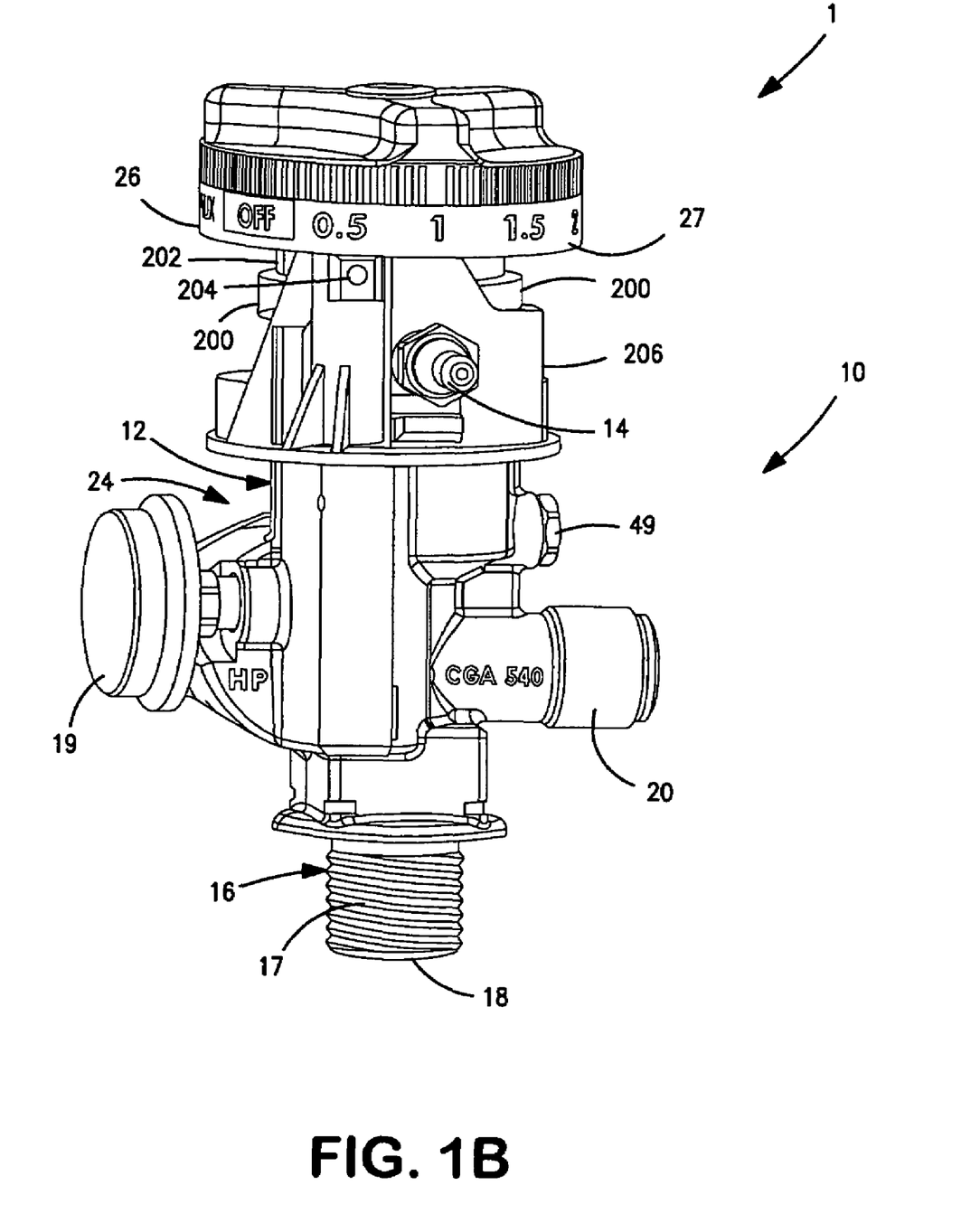
FIG. 1B is a front perspective view of an alternate embodiment of the gas cylinder dispensing valve in accordance with the present invention.

With reference to FIG. 1 a gas cylinder dispensing valve 1 in accordance with the present invention is illustrated. The specific embodiment illustrated is designed to dispense therapeutic respiratory gas such as oxygen or mixtures of gas that might include oxygen with helium, nitrogen, carbon dioxide, nitrous oxide, nitric oxide, etc. This being said, such specific embodiment is not to be taken as limiting in that the present invention is equally applicable to other gas dispensing applications that require the use of compressed gas cylinders and the dispensing of the gas at a regulated pressure and at regulated flow rates.

Gas cylinder dispensing valve 1 is provided with a body 10 that includes a top section 12 having a gas outlet 14 to discharge the gas to be dispensed. As illustrated, gas outlet 14 is in the form of a nipple-like fitting designed to couple with a hose for dispensing the oxygen for therapeutic purposes. Body 10 is also provided a lower section 16 that is configured to couple with an open head portion of a compressed gas cylinder, not illustrated, by way of threads 17.

Figure 2A:
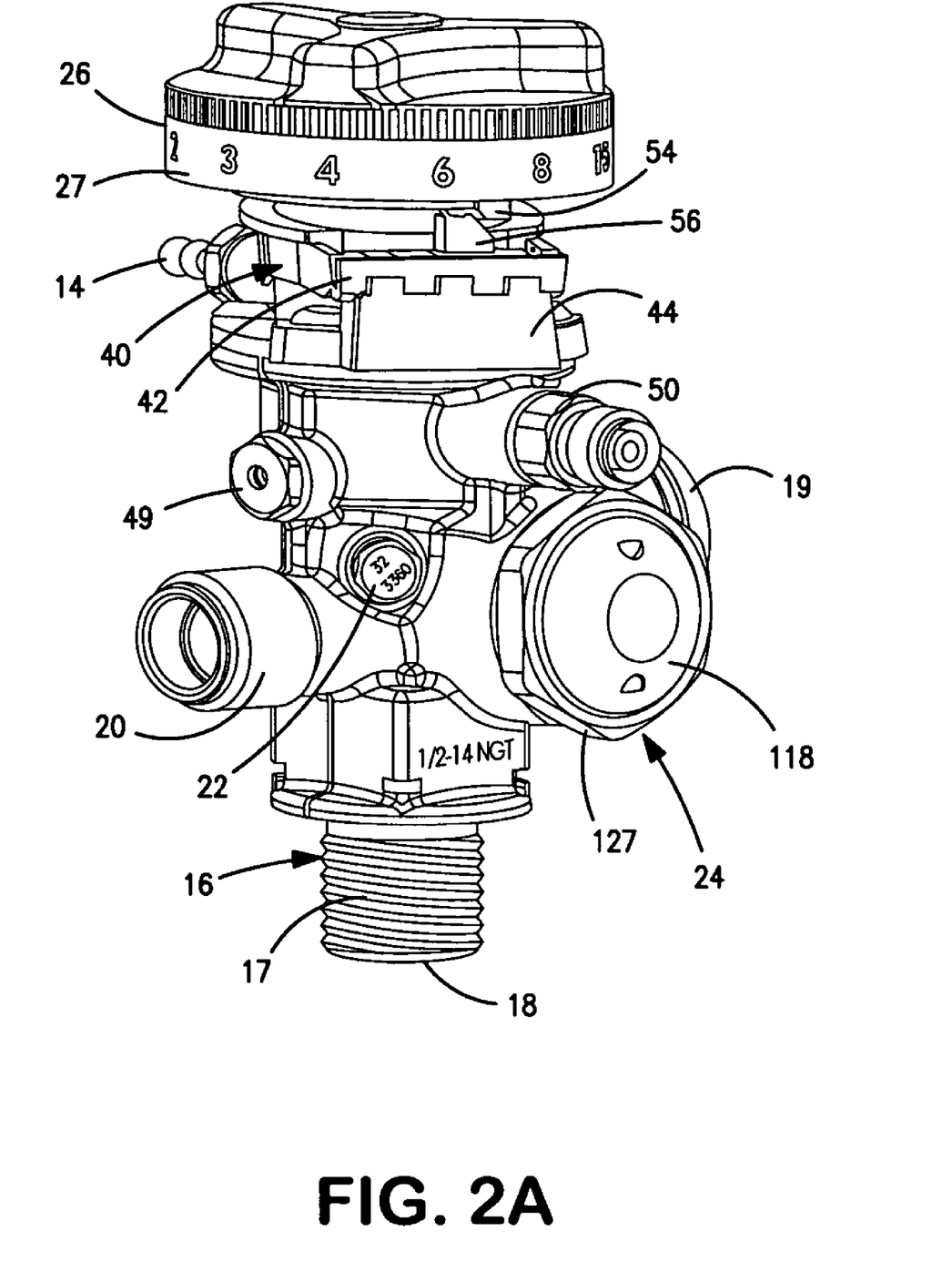
FIG. 2 is a rear perspective view of the gas cylinder dispensing valve illustrated in FIG. 1.
Figure 2B:
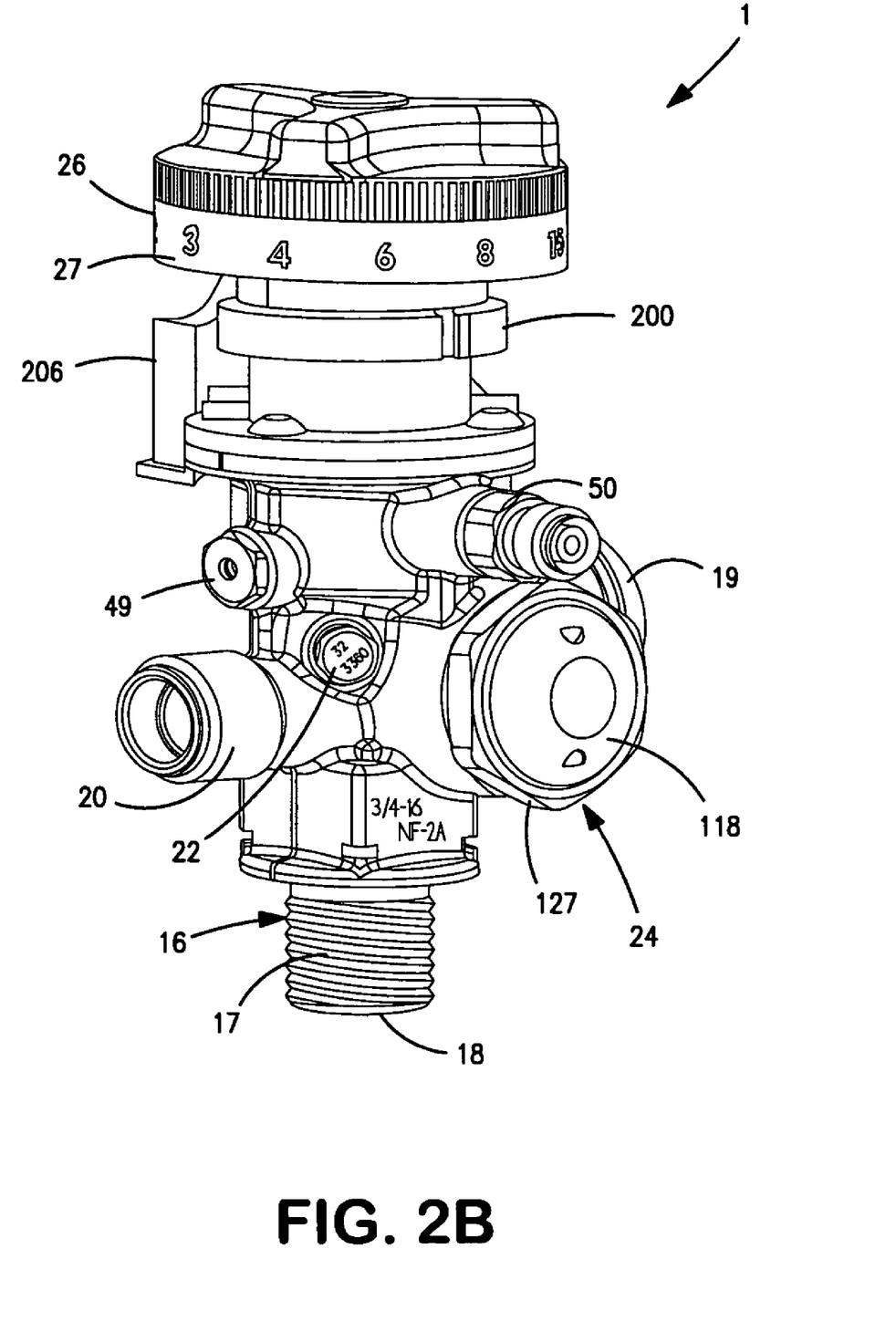
FIG. 2B is a rear perspective view of the embodiment of the gas cylinder dispensing valve illustrated in FIG. 1B.
Figure 3:
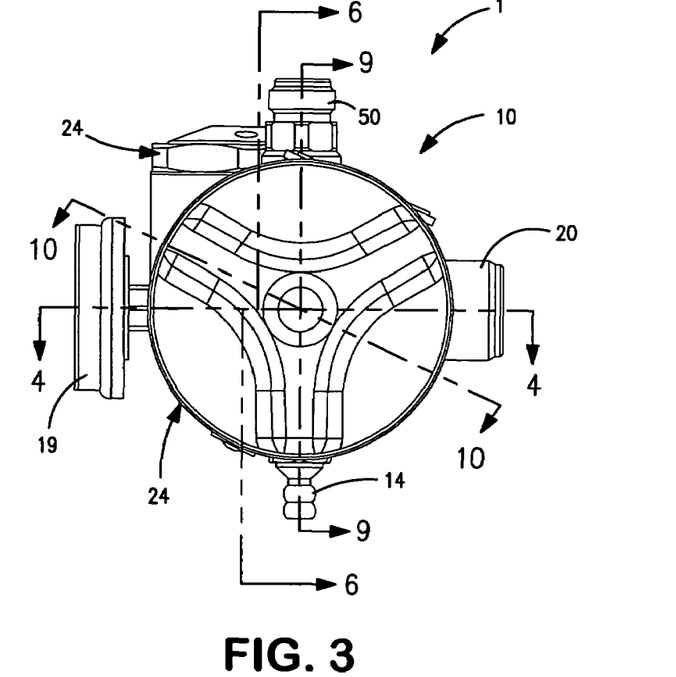
FIG. 3 is a top plan view of the gas cylinder dispensing valve illustrated in FIG. 1.

With additional reference to FIGS. 2 and 3, high pressure gas from the gas cylinder passes through an internal flow path having internal passages within body 12 to be described in more detail hereinafter. The compressed gas enters such internal flow path through a gas inlet in the form of an inlet opening 18 provided in lower section 16 of body 10 and is discharged after having been regulated through gas outlet 14. A pressure gauge 19 is provided to measure the pressure of the high pressure gas in order to determine whether the compressed gas cylinder needs refilling and also, during refilling operations, to confirm when the compressed gas cylinder is filled to capacity. In this regard, a refill port 20 is provided to allow the gas cylinder to be refilled with gas cylinder dispensing valve 1 attached to the gas cylinder. In practice, although not illustrated, refill port 20 can be covered with a dust cap. A conventional high pressure burst fitting 22 is provided. Burst fitting 22 is designed to rupture due to excessive pressure in the gas cylinder and remain attached to top section 12 of body 10. The pressure rating for burst fitting 22 is between about 3025 psig and about 3360 psig for use in connection with a gas cylinder having a fill pressure of about 2200 psig.

The high pressure gas then flows to an isolation valve, designated hereinafter by reference number 96, and then to a pressure regulator 24 that is designed to reduce the gas pressure to level suitable for patient use, for instance, 50 psig.

The flow rate of the gas is controlled by a flow control valve, also to be discussed in more detail hereinafter, which is adjusted by control knob 26. Clockwise rotation of control knob 26 controls the flow rate. Control knob 26 also functions to actuate the isolation valve by way of an actuation element, in this case a tooth-like projection 28 depending from control knob 26 that is provided with a sloped leading edge 30. Upon rotation of the control knob 26 in a counterclockwise direction, tooth-like projection 28 at the sloped leading edge 30 contacts a ramp-like portion 38 of a recessed hat-like element 48 of cover 40. The recessed hat-like element 48 covers a protruding portion 101 of a valve stem portion of the isolation valve 96 to activate the isolation valve 96 and thereby cut-off the flow of high pressure gas within the internal flow path.

Figure 9:
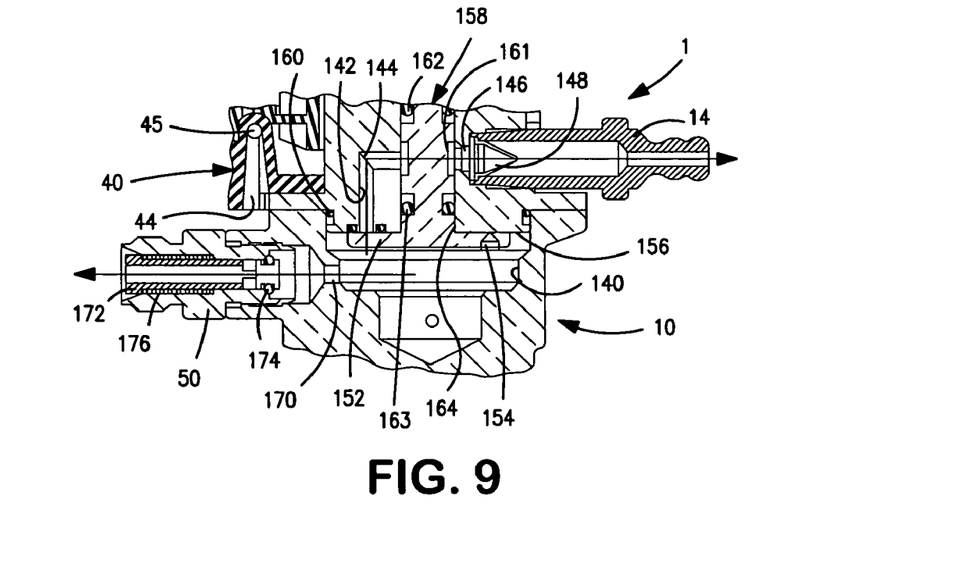
FIG. 9 is a fragmentary, cross-sectional view of the gas cylinder dispensing valve illustrated in FIG. 1 taken along line 9-9 of FIG. 3.

Cover 40 is hinged to top section 12 of body 10 at a section 42 thereof, opposite to ramp-like portion 44, to pivotably connect cover 40 to an upright projection 44 of top section 12. With brief reference to FIG. 9, a rod 45 allows connection and pivotable action of such hinge. The pivotable connection allows movement of cover 40 when isolation valve 96 is activated and deactivated. In this regard, cover 40 is provided with a notch 46 so that cover 40 clears gas outlet 14 during operational movement. Cover 40 thus, covers top section 12 of body 10 to ease activation of isolation valve 96 and through the use of recessed hat-like portion 48, prevents particulate contaminants and the like from entering isolation valve 96. Although less preferred, a flexible boot covering protruding portion 101 of isolation valve 96 could be used in place of cover 40. Even less preferred, cover 40 could be deleted to allow for direct activation of isolation valve 40 by tooth-like projection 28.

An auxiliary outlet port 50 is provided so that gas cylinder dispensing valve 1 can be used for such auxiliary purposes as being connected to a ventilator. Additionally, a low pressure relief valve 49 is provided to release pressure should gas cylinder dispensing valve 1 inadvertently be back pressured to an unacceptable extent.

Control knob 26 is provided with a skirt 27 having markings indicating an "OFF" position at which isolation valve is closed, calibrated flow rates and an auxiliary position ("AUX") that is used when it is desired to dispense the gas from auxiliary outlet port 50. Rotation of control knob 26 is preferably stopped at highest flow rate directed by way of a lug 54 that depends from control knob 26 and contacts a projection 56 attached to projection 44. A particular flow rate or function, "OFF" or "AUX" is selected when the same are opposite gas outlet 14.

Gas cylinder dispensing valve 1 is conventionally fabricated from forged brass. Control knob 26 and cover 40 can be fabricated from impact resistant plastic.

Figure 4:
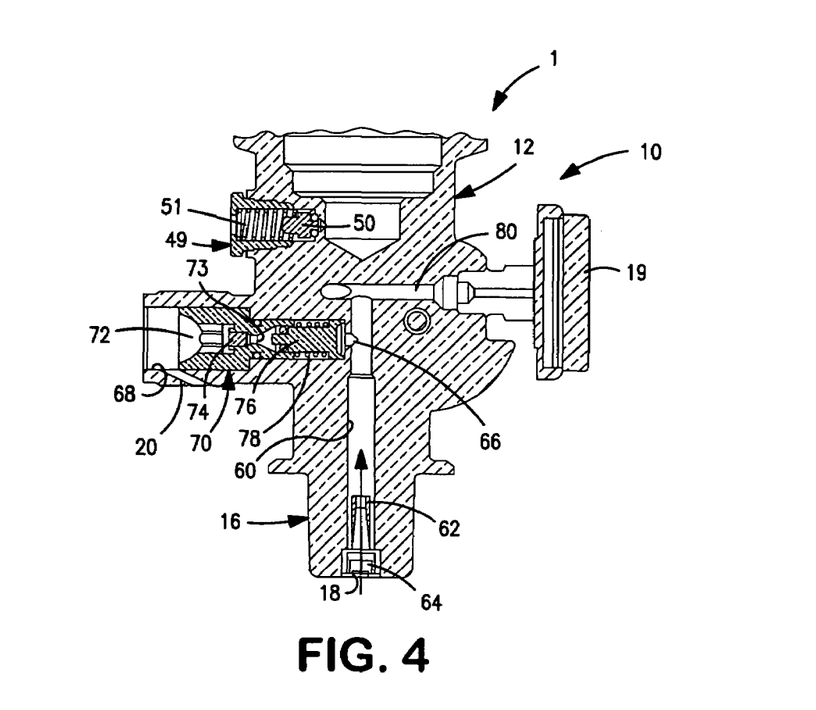
FIG. 4 is a fragmentary, cross-sectional view taken along line 4-4 of FIG. 3.

With reference to FIG. 4, compressed gas enters gas cylinder dispensing valve 1 through gas inlet 18, an opening of the internal flow path which is defined in a first inlet passage 60 of such internal flow path. First inlet passage 60 can contain a known, porous particulate filter 62 formed of sintered brass and held in place by threaded fitting 64.

A refill passage 66 communicates between first inlet passage 60 and refill port 20. Refill port 20 is provided with an enlarged refill passage 68 situated within refill port 20. Located within refill passage 68 is a known refill valve assembly 70, which for purposes of illustration is illustrated in an open position. Refill valve assembly 70 is provided with an inlet fitting 72 having an inlet passage 73 and a filter 74 formed of sintered brass. Additionally a movable valve element 76 is biased by spring 78 to an open position. When the cylinder is to be filled, a known coupling is attached to refill port and the gas pressure urges valve element 76 into its illustrated open position. The pressure in the gas cylinder maintains movable valve element 76 in a normally closed position.

Pressure gauge 19 also communicates with the first inlet passage 60 by way of an instrument passage 80 so that pressure gauge 19 is exposed to the gas pressure within the gas cylinder.

Figure 5:
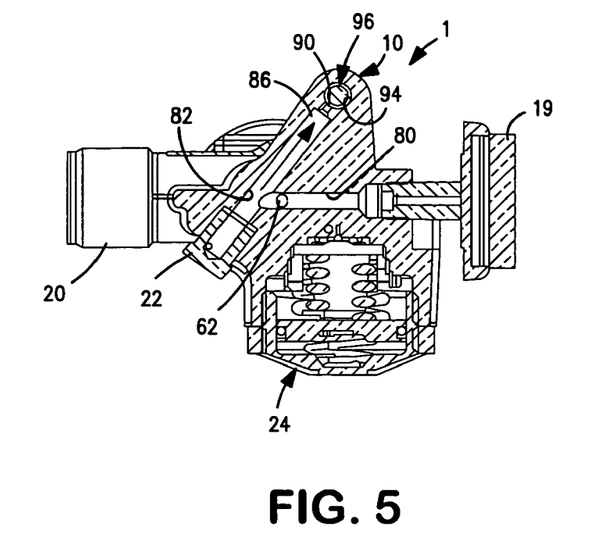
FIG. 5 is a cross-sectional view of FIG. 1 taken along line 5-5 of FIG. 1.
Figure 8A:
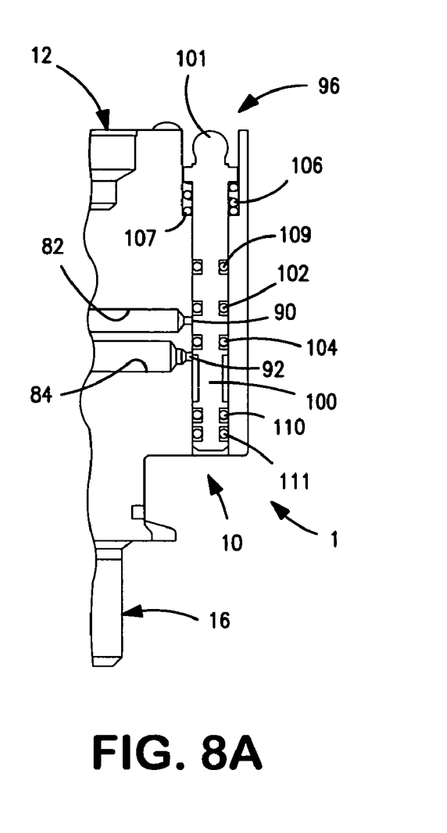
FIG. 8, is a schematic, sectional view of the gas cylinder dispensing valve illustrated in FIG. 1 with an embodiment of the isolation valve shown in the closed position.

With reference to FIGS. 5 and 8, first inlet passage 60 leads into second and third inlet passages 82 and 84 that terminate at ends 86 and 88 respectively, in two peripheral openings 90 and 92 of an isolation valve bore 94.

Isolation valve 96 is located within isolation valve bore 94 and is of elongated rod-like configuration. Isolation valve 96 is provided with a valve stem portion 98 and a valve portion 100. Valve portion 100 is formed of a constricted section of isolation valve 96 that allows for the passage of flow when the isolation valve 96 is in an open position and two o-ring seals 102 and 110 provide a seal within isolation valve bore 94. O-ring seals 102 and 104 prevent the flow of gas from the isolation valve bore 94, when isolation valve 96 is downwardly depressed into a closed position by protruding portion 101 of valve stem portion 98 that protrudes from the top section 12 of the body 10. Since the o-ring seals 102 and 104 are directly exposed to high pressure gas, the gas pressure helps push the seals against the isolation valve bore 94 to help in sealing. O-ring seals 102 and 104 are formed of an elastomeric compound, for instance, known fluorocarbons.

Isolation valve 96 is biased in an open position by way of a spring 106 that bears against a shoulder 108 of isolation valve 96 and those bottoms within a step 107 of isolation valve bore 94. As is apparent, isolation valve 96, at projection 101, seats within recessed hat-like element 48 of cover 40 and is thus held within isolation valve bore 94 by cover 40.

As illustrated, isolation bore 94 is open at opposite ends. As such, wipers are preferably provided by o-rings seal 109 and 111. A further o-ring pressure seal is provided by o-ring 110.

Figure 7A:
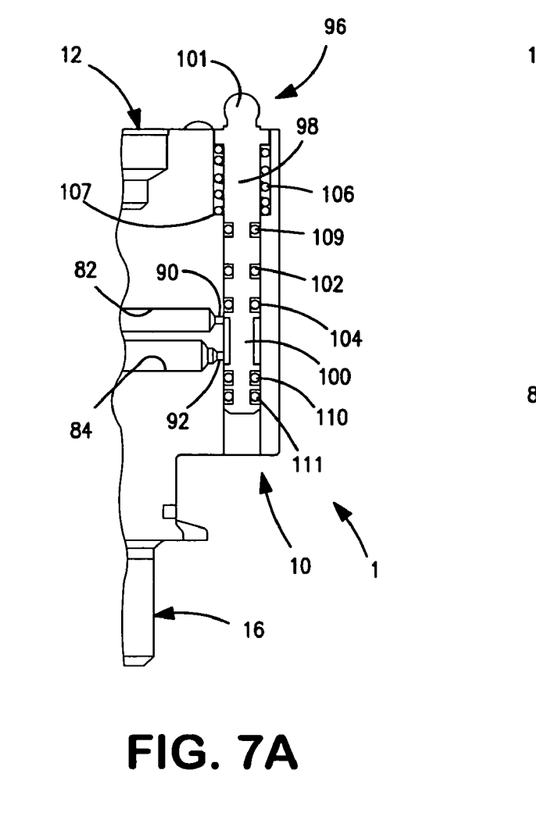
FIG. 7 is a schematic, sectional view of the gas cylinder dispensing valve illustrated in FIG. 1 showing an embodiment or the isolation valve in the open position.

With reference to FIGS. 7 and 8, FIG. 7 illustrates isolation valve 96 in the open position. High pressure gas flows through second inlet passage 82, through peripheral opening 90 and into the isolation valve bore 94. The open area provided by constricted section 100 allows the gas to flow through peripheral opening 92 and then out of third inlet passage 84. It is to be noted that peripheral openings 90 and 92 are a much smaller transverse, cross-sectional area than second and third inlet passages 82 and 84 to prevent the force of the high pressure gas from constricting isolation valve 96 within isolation valve bore 94. A further point that other valve designs could be used, for instance, in place of the constricted section, the rod-like construction of isolation valve 96 could be provided with connected passages that would be designed to line up with peripheral openings 90 and 92 when isolation valve 96 is to be activated into its open position. This, however, would require a certain degree of precision in operation and thus more complexity for such an embodiment.

When control knob 26 is rotated to the "OFF" position and leading edge 30 of tooth-like projection 28 contacts ramp-like portion 38 of cover 40, cover 40 is urged downwardly to in turn urge isolation valve 96 into the closed position illustrated in FIG. 8. At this point, peripheral opening 90 and therefore second inlet passage 82 is isolated between o-rings 102 and 104 to prevent high pressure gas from flowing from second inlet passage 82 to third inlet passage 84. Rotation of control knob 26 from the "OFF" position, in the opposite direction, disengages depending tooth-like projection 28 from ramp-like portion 38 to allow isolation valve 96 to return to the open position.

As illustrated, isolation valve 96 is oriented so that it can be operated by a cam-like action of tooth-like projection 28 as control knob 26 is rotated. This provides a compact layout for gas cylinder dispensing valve 1. Although less preferred, isolation valve 96 could be oriented transversely to the axis of body 10 or in the direction of control knob 26. In such case, the tooth-like projection 28 or other contact element would contact protruding portion 101 head-on to activate isolation valve 96.

A further point concerns the bias of isolation valve 96, which is biased in the open position. It is possible to bias any isolation valve in the closed position. This could easily be done with isolation valve 96 by simply reversing the positions of the constricted portion 100 and the two o-ring seals 102 and 104 so that at rest, o-rings seals 102 and 104 would isolate peripheral opening 90. In such case, however, tooth-like projection 28 would have to be displaced and extended around skirt 27 to activate isolation valve 96 into its open position. This would of course be less preferred in that it would increase the force required to operate control knob 26.

With reference again to FIG. 6, third inlet passage 84 terminates at pressure regulator 24 for reduction of pressure. Pressure regulator 24 is of conventional design. High pressure gas enters a valve seat portion 112 that is sealed within second inlet passageway 88 by an o-ring seal 114. Valve seat portion 112 is preferably provided with the filter, not illustrated, for filtering particulate matter. An internal chamber 116 provided by dome 118 is divided into high and low pressure sides 120 and 122 by a piston 124 having peripheral o-ring seal 126. Dome 118 is held in place by a retaining nut 127. Integrally formed with piston 124 is a valve 128 that is provided with an axial passageway (not shown) that communicates between the high and low pressure sides 120 and 122. Such passageway is provided with ports 130 to allow incoming high pressure gas flow through the axial passageway from low pressure side 122 to high pressure side 120. If pressure is below a pressure set point, incoming gas drives piston 124 against a bias provided by a spring 132 urging valve 128 in the open position.

Figure 6:
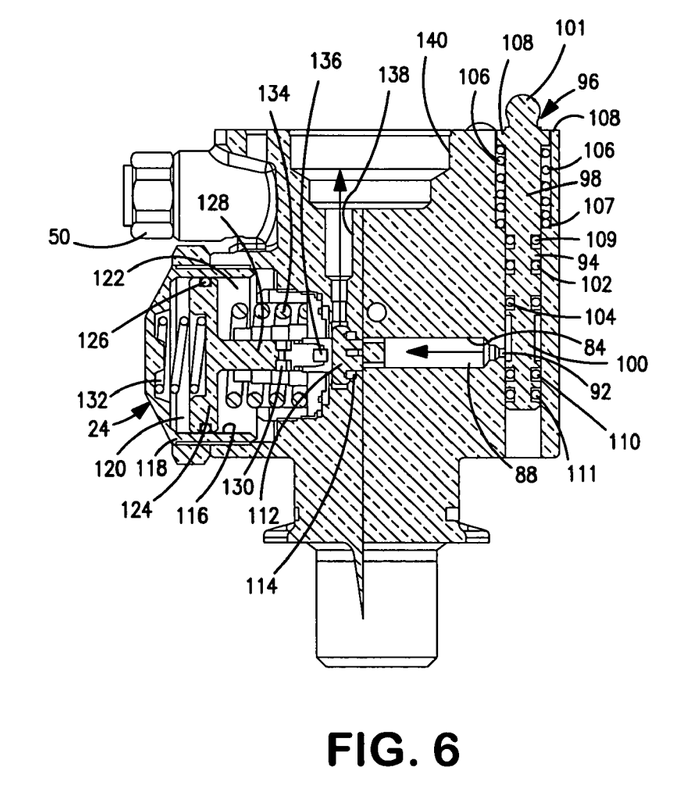
FIG. 6 is an elevational, cross-sectional view taken along line 6-6 of FIG. 3.

If pressure increases, pressure bearing against piston 124 at high pressure side 120 drives valve 128 toward valve seat element 112 against the bias provided by spring 134 until fibrous tip portion 136 of valve 128 is driven against valve seat portion 112 sealing its internal passageway. At this point, since no pressurized gas is acting against pressure regulator 24, valve 128 moves away from valve seat element 112 to re-establish the flow of gas. As understood by those skilled in the art, the foregoing operation at certain pressures can be oscillatory.

Pressure regulator 24 can be said to divide the internal flow path for the gas into high and low pressure sides. The high pressure side has been previously discussed. As to the low pressure side, regulated gas flows into a first outlet passage 138 and into a cavity 140 of the flow path. With reference again to FIG. 4, low pressure relief valve 49 is in communication with cavity 140. Low pressure relief valve 49 is conventional and consists of a valve 50 biased in the closed position by a spring 51. With additional reference to FIG. 9, in a manner that will be discussed, the gas flows through a first outlet passage 142, a second outlet passage 144 and a third outlet passage 146 that communicates with gas outlet 14. Gas outlet 14 can be provided with a filter 148 to prevent backflow of material into gas cylinder dispensing valve 1. A check valve can also be used with the advantage that such a device prevents backflow of liquid.

Cavity 140 houses a flow control valve that is in the form of a disk-like orifice plate 152 having peripheral orifices that are calibrated for particular flow rates. Such a calibrated orifice is illustrated by reference numeral 154. The top of cavity 140 has a bearing surface 156 along which disk-like orifice plate 152 rides. Disk-shaped orifice plate 152 is connected to control knob 26 by way of a control shaft 158. When control knob 26 is rotated to specific positions that, as illustrated in FIGS. 1 and 2, are marked with flow rates on skirt portion 27 thereof, a particular corresponding orifice, for instance orifice 154 is brought into registry with first outlet passage 142 to select and thereby meter a particular calibrated flow rate of gas to gas outlet 14. Sealing is provided by a circular seal 160 set into bearing surface 156.

For the sake of compact construction, control shaft 158 is provided with a constricted portion 161 that permits the flow of gas from second outlet passage 144 to third outlet passage 146. O-ring seals 162 and 163 prevent the escape of gas from control shaft bore 164 that contains the control shaft 158.

Disk-like orifice plate 152 is provided with a region without an orifice. Control knob 26 is able to be manipulated to such position that is referred to in FIG. 1 as "AUX". In the illustration, it is at the far left of skirt-like portion 27 of control knob 26. In such position, gas is unable to flow out of gas outlet 14. The purpose of this is to allow gas to be dispensed from auxiliary outlet 50 that connects to cavity 140 via a transfer passage 170. Different flow restrictions through the auxiliary outlet 50 could be employed, for example, in situations where the gas is a Heliox mixture, or nitric oxide mixture rather than oxygen.

A possible alternative embodiment to the flow control valve employing disk-like orifice plate 152 is to have a known vertically acting flow control valve that is driven by providing the control shaft 158 with threads to produce the required motion.

Auxiliary outlet port 50 is provided with a valve 172 that is normally driven to the closed position by gas pressure. A seal is effectuated at valve 172 via an o-ring seal 174. Valve 172 is also biased in the closed position by a spring 176. A specially designed and known gas coupling can engage auxiliary outlet port 50 by way of a projection to engage valve 172 and thereby urge valve 172 into the open position to allow the escape of the regulated gas.

Figure 10:
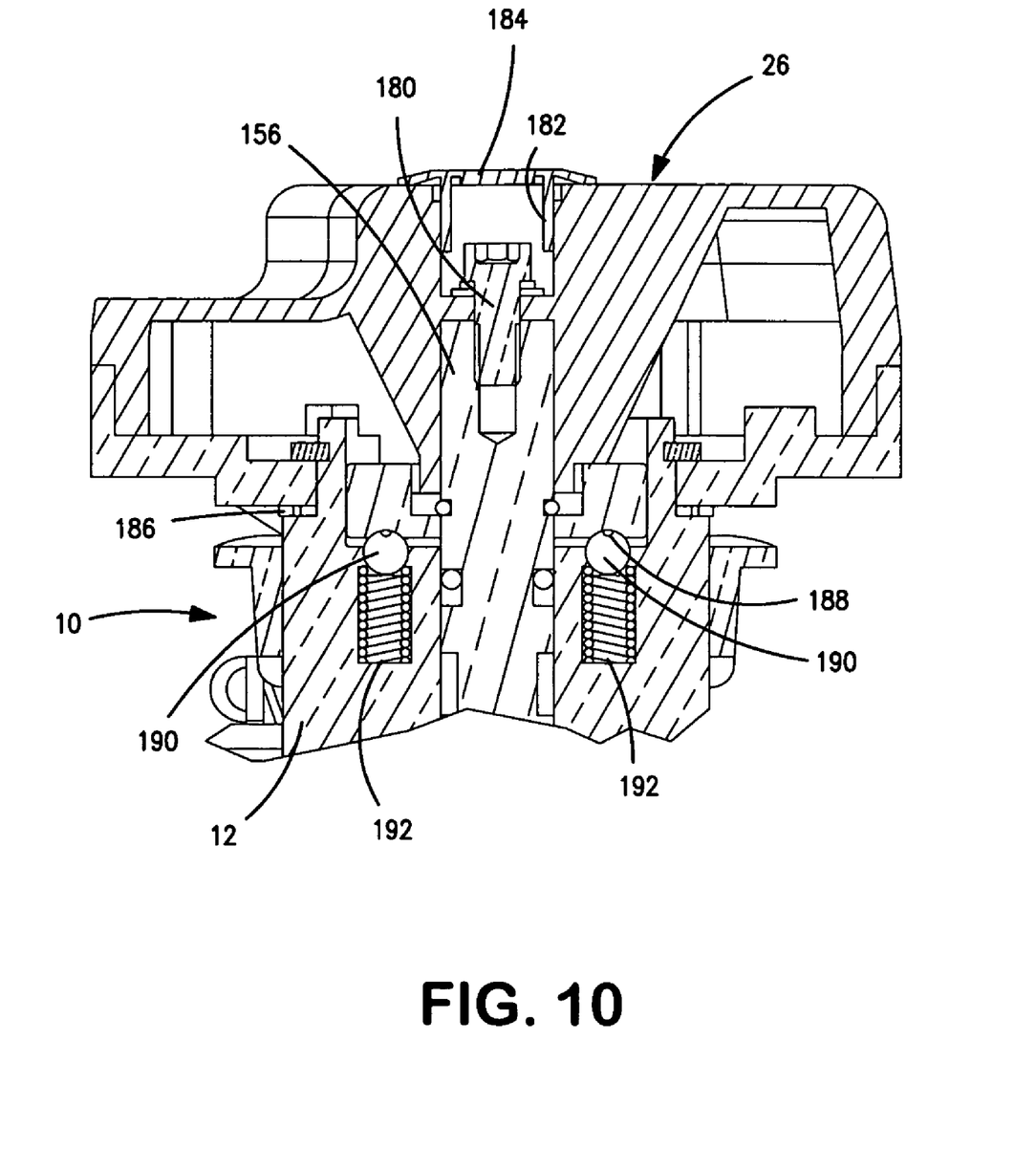
FIG. 10 is a fragmentary, cross-sectional view of the gas cylinder dispensing valve illustrated in FIG. 1 taken along line 10-10 of FIG. 3.

With reference to FIG. 10, control knob 26 is connected to control shaft 156 by way of a retaining stud 180 that is located within a recess 182 of control knob 26. Recess 182 is covered by a cap 184. Attached to control shaft 156 is a collar 186 that is provided with detents or indentations 188 that correspond to positions of control shaft 156 in which specific calibrated orifices and functions such as "OFF" and "AUX" are brought into registry with second outlet passage 142. A spring loaded element, which can be formed of one or more bearings 190 biased by springs 192, engages indentations to retain control knob 26 in position in a releasable manner.

A yet further possible modification of gas cylinder dispensing valve 1 concerns the formation of tooth-like projection 28. A less preferred embodiment would be to attach tooth-like projection 28 to an arm or the like that would be connected to control shaft 158. A further alterative would be to provide a contact element for isolation valve 96 as a cam formed in the undersurface of control knob 26. All that is required is that the particular contact element used must be associated with the control knob 26 so that it rotates therewith. This being said, the forgoing alternatives are not preferred in that they would not result in the compact design for the illustrated gas cylinder dispensing valve.

Figure 11:
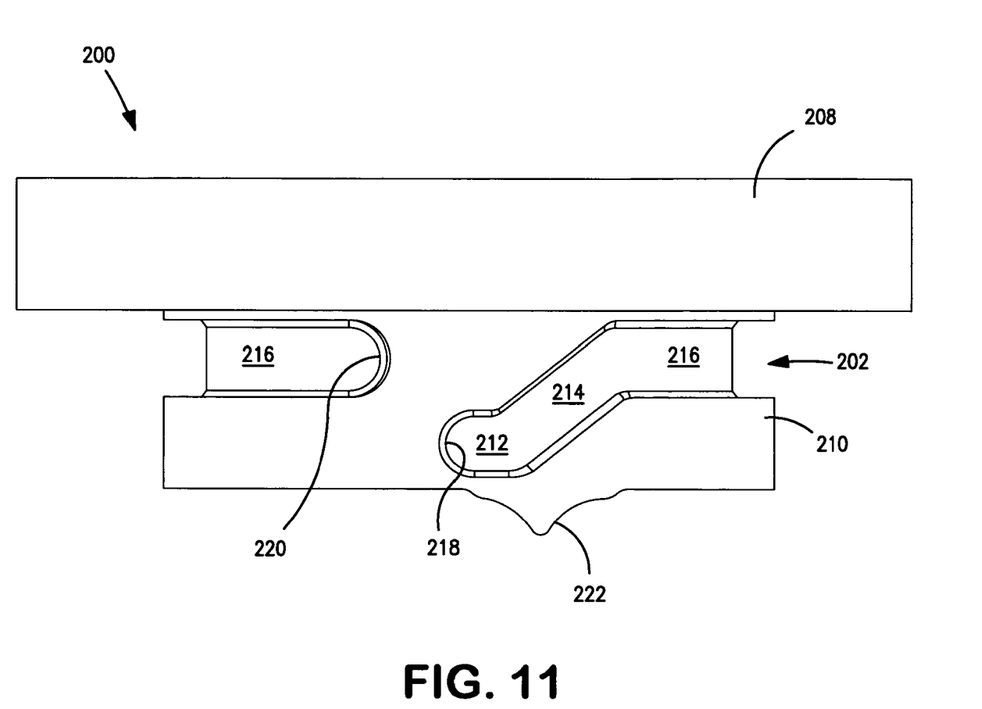
FIG. 11 is a view of the control knob collar used in an embodiment of the gas cylinder dispensing valve illustrated in FIG. 1B and FIG. 2B.

However, an alternate embodiment of the gas cylinder dispensing valve 1 that provides the actuation of the isolation valve in a somewhat different yet preferred manner is shown in FIGS. 1B, 2B, 7B, 8B, and 11. The alternate embodiment simplifies the construction of the gas cylinder dispensing valve 1 by eliminating the need for the tooth-like projection 28, ramp like portion 38, cover 40, section 42, notch 46, hat-like element 48, lug 54, projection 56, spring 106, and associated parts previously described with regard to FIGS. 1, 2 and 6. Rather, the alternate embodiment of FIGS. 1B and 2B employs a collar 200, having a track 202, an isolation valve guide 204, and a protective shell 206. The collar 200 and track 202 are shown in more detail in FIG. 11 which shows the collar 200 as including a head portion 208 and a track portion 210. The track portion 210 further includes a recessed lower track portion 212, a recessed incline portion 214, a recessed upper track portion 216, a lower track end 218, and an upper track end 220. Also seen in FIG. 11 is a rotational stop 222 protruding in a downward fashion from the track portion 210 of the collar 200.

The track 202 of the collar 200 is adapted to receive the isolation valve guide 204 or similar such activation element. When the isolation valve 96 is in the closed position, the isolation valve guide 204 resides within the lower track portion 212. As the control knob 26 is turned in a clockwise direction, the isolation valve guide 204 traverses along the incline portion 214 to the upper track portion 216 where the isolation valve 96 is in the open position. As the isolation valve guide 204 moves from the lower track portion 212 via the incline portion 214 to the upper track portion 216 of the collar 200, the isolation valve stem portion 98 is pulled in an upward orientation actuating the isolation valve 96 to its open position (See FIG. 7B). Similarly, when the control knob 26 is turned in a counter-clockwise direction, the isolation valve guide 204 traverses along the upper track portion 216, down the incline portion 214 to the lower track portion 212 where the isolation valve stem portion 98 moves in a downward orientation actuating the isolation valve 96 to its closed position (See FIG. 8B). Rotation of control knob 26 is preferably stopped at highest flow rate when the isolation valve guide 204 reaches the upper track end 220 by way of a rotational stop 222 that contacts a corresponding structure to prevent further rotation.

Figure 7B:
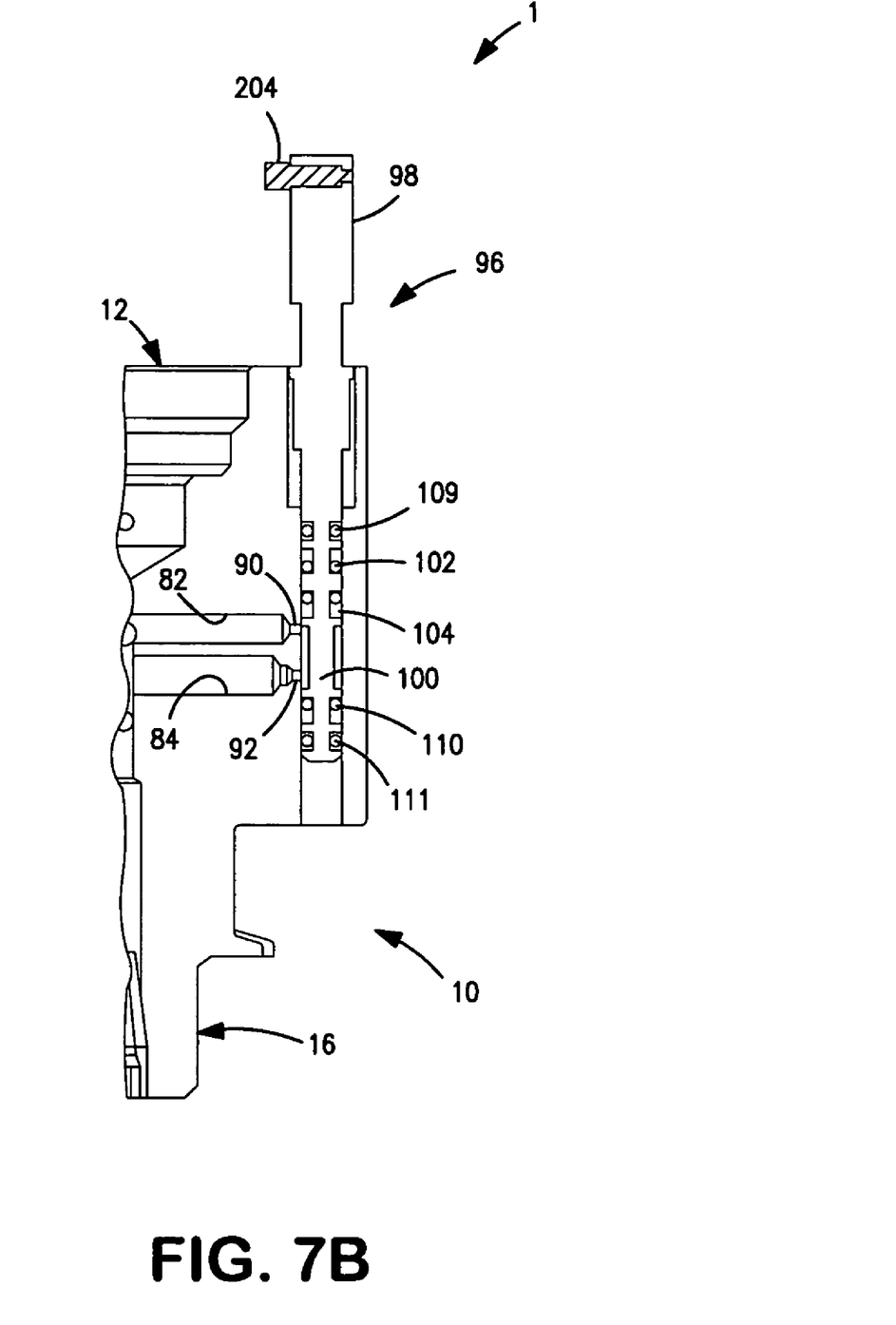
FIG. 7B, is a schematic, sectional view of the gas cylinder dispensing valve illustrated in FIG. 1B with an alternate embodiment of the isolation valve shown in the open position.
Figure 8B:
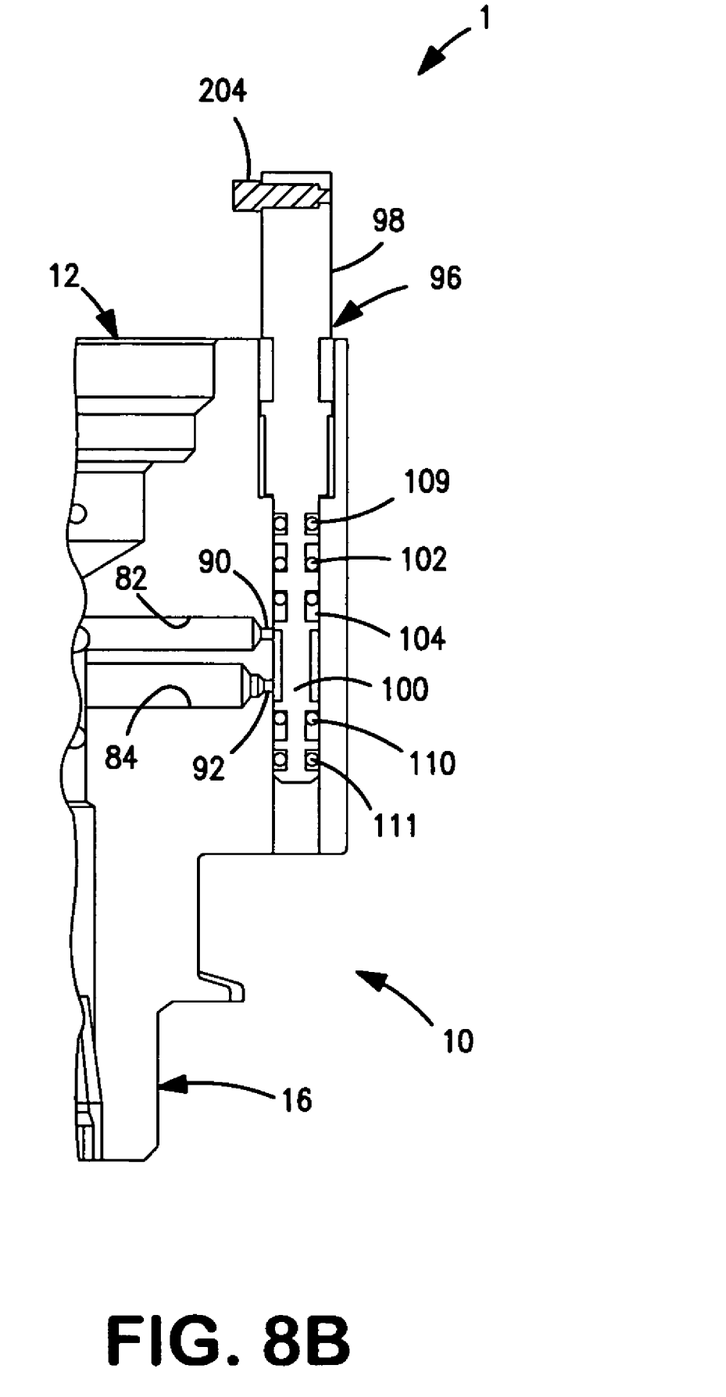
FIG. 8B, is a schematic, sectional view of the gas cylinder dispensing valve illustrated in FIG. 1B with an alternate embodiment of the isolation valve shown in the closed position.

Turning now to FIGS. 7B and 8B, FIG. 7B illustrates the alternate embodiment of the isolation valve 96 in the open position. As with the previously described embodiment, high pressure gas flows through second inlet passage 82, through peripheral opening 90 and into the isolation valve bore 94. The open area provided by constricted section 100 allows the gas to flow through peripheral opening 92 and then out of third inlet passage 84. It is to be noted that peripheral openings 90 and 92 are a much smaller transverse, cross-sectional area than second and third inlet passages 82 and 84 to prevent the force of the high pressure gas from constricting isolation valve 96 within isolation valve bore 94.

FIG. 8B illustrates the alternate embodiment of the isolation valve 96 in the closed position. When control knob 26 is rotated to the "OFF" position and the isolation valve guide 204 is urged into the lower track portion 212 of the collar 200, the isolation valve 96 is urged into the closed position. In the closed position, peripheral opening 90 and therefore second inlet passage 82 is isolated between o-rings 102 and 104 to prevent high pressure gas from flowing from second inlet passage 82 to third inlet passage 84. Rotation of control knob 26 from the "OFF" position, in the opposite direction, causes positive displacement of the isolation valve guide 204 along the track 202 to move the isolation valve 96 in an axial direction back to the open position.

Except for the operation of the isolation valve 96, all other aspects of the illustrated alternate embodiment of the gas cylinder dispensing valve 1 operate the same or substantially as described above in conjunction with the first embodiment and FIGS. 1 through 6, 9 and 10. As such, the descriptions will not be repeated here.

While the present invention has been described with reference to several preferred embodiments, as will occur to those skilled in the art, numerous changes, additions and omissions may be made without departing from the spirit and scope of the present invention, as set forth in the claims.

What is claimed is:

1. A gas cylinder dispensing valve for dispensing a gas from a compressed gas cylinder comprising:
   a body configured to couple with an open head portion of a gas cylinder and having an internal flow path communicating between a gas inlet and a gas outlet;
   a pressure regulator to regulate gas pressure of a flow of the gas within the internal flow path;
   an isolation valve positioned within the internal flow path, between the gas inlet and the pressure regulator and having a linear action between a closed position and an open position, a valve stem projecting from the body to actuate the isolation valve;
   a flow control valve positioned within the internal flow path, between the pressure regulator and the gas outlet, to control flow rate of the flow of the gas, the flow control valve having a rotating control shaft projecting from the body to adjust the flow control valve;
   a control knob to rotate the rotating control shaft; and
   an actuation element associated with the control knob so as to rotate therewith and impart motion to the isolation valve,
   wherein rotation of the control knob causes the isolation valve to move between the closed position and the open position and further rotation of the control knob adjusts the flow control valve and therefore controls the flow of the gas.

2. The gas cylinder dispensing valve of claim 1, wherein the actuation element is a valve guide that is operatively associated with the control knob such that rotation of the control knob imparts motion to the valve guide which in turn causes the isolation valve to move between the closed position and the open position.

3. The gas cylinder dispensing valve of claim 2, wherein the control knob further includes a collar having a track disposed therein and the valve guide movably disposed within the track such that rotation of the control knob imparts moves the valve guide along the track which in turn causes the isolation valve to move between the closed position and the open position.

4. The gas cylinder dispensing valve of claim 1, wherein the isolation valve is biased in an open position and that rotation of the control knob imparts motion to the isolation valve against the bias and causes the isolation valve to move to the closed position.

5. The gas cylinder dispensing valve of claim 4, wherein:
   the isolation valve is of rod-like configuration;
   the body has an isolation valve bore to contain the isolation valve;
   the valve stem has a shoulder; and
   the bias of the isolation valve is effected by a spring located within the isolation valve bore so that movement the valve stem into the isolation valve bore causes the shoulder to compress the spring.

6. The gas cylinder dispensing valve of claim 5, wherein the isolation valve bore is of stepped configuration and the spring is located between a step of the isolation valve bore and the shoulder of the valve stem.

7. The gas cylinder dispensing valve of claim 1 wherein the valve bore further defines at least two peripheral openings and the isolation valve further comprises a seal proximate the peripheral openings of to cut off the flow of the gas to the pressure regulator when the isolation valve is the closed position.

8. The gas cylinder dispensing valve of claim 7, wherein the isolation valve further comprises:
   a constricted portion adapted to be moved adjacent to the at least two peripheral openings to allow the flow of the gas to the pressure regulator when the isolation valve is the open position; and
   a plurality of o-ring seals spaced from the constricted portion and adapted to isolate one of the peripheral openings when the isolation valve is in the closed position.

9. The gas cylinder dispensing valve of claim 7 wherein the flow path terminates at two peripheral openings of the valve bore and the isolation valve is configured to seal at least one of the two peripheral openings of the flow path in direct communication with the gas inlet when in the closed position to cut off the flow of the gas to the pressure regulator.

10. The gas cylinder dispensing valve of claim 9 wherein the isolation valve has a constricted portion adapted to be moved adjacent to the two peripheral openings to allow the flow of the gas when the isolation valve is the open position and two, spaced o-ring seals, spaced from the constricted portion and adapted to isolate the one of the two peripheral openings when the isolation valve is in the closed position.

11. The gas cylinder dispensing valve of claim 1, wherein the actuation element is a tooth-like projection configured with a cam-like action to impart motion to the valve stem of the isolation valve to move the isolation valve against the bias to the closed position.

12. The gas cylinder dispensing valve of claim 1, wherein:
   the flow path having a cavity between the pressure regulator and an outlet flow passage communicating at one end with the cavity and at the other end extending toward the gas outlet;
   the cavity having a bearing surface and a circular seal within the bearing surface;
   the one end of the outlet flow passage terminates at the circular seal; and
   the flow control valve has a disk-shaped orifice plate located within the cavity, adjacent the bearing surface, connected to the control shaft and having peripheral, calibrated orifices, each calibrated for a specific flow rate of the gas and operable to be brought into registry with the one end of the second outlet flow passage through rotation of the control shaft by the control knob.

13. The gas cylinder dispensing valve of claim 12, wherein:
   the body having an auxiliary outlet in flow communication with the cavity to discharge the gas;
   the auxiliary outlet having a spring loaded valve biased in a closed position to prevent escape of the gas and configured to engage a gas coupling having a projection to open the spring loaded valve when the gas coupling engages the auxiliary outlet; and the disk-shaped orifice plate having an auxiliary region of the disk without a calibrated opening that is operable to be brought in registry with the one end of the second outlet flow passage through rotation of the control shaft by the control knob when the escape of gas is desired from the auxiliary outlet.

14. The gas cylinder dispensing valve of claim 13, further comprising:
the control knob having indentations associated with the calibrated orifices and the auxiliary region to releasably retain the control knob in position; and
at least one spring-loaded element is connected to the upper section of the body to engage the indentations and therefore releasably retain the control knob in position.

15. The gas cylinder dispensing valve of claim 1, further comprising the body having a refill port in communication with the flow path between the isolation valve and the gas inlet to allow the gas cylinder to be refilled with the gas cylinder dispensing valve coupled thereto.

16. The gas cylinder dispensing valve of claim 1, further comprising a pressure gauge connected to the body and in communication with the flow path between the pressure regulator and the flow control valve.

17. A gas cylinder dispensing system comprising:
a gas cylinder having an open head portion;
a therapeutic respiratory gas disposed in the gas cylinder;
a valve body coupled to the open head portion of a gas cylinder and having an internal flow path communicating between a gas inlet and a gas outlet;
a pressure regulator to regulate gas pressure of a flow of the gas within the internal flow path;
an isolation valve positioned within the internal flow path, between the gas inlet and the pressure regulator and adapted to move between a closed position and an open position;
a flow control valve positioned within the internal flow path, between the pressure regulator and the gas outlet, to control flow rate of the flow of the gas, the flow control valve having a rotating control shaft projecting from the body to adjust the flow control valve;
a control knob to rotate the rotating control shaft; and
an actuation element associated with the control knob so as to rotate therewith and impart motion to the isolation valve wherein rotation of the control knob causes the isolation valve to move between the closed position and the open position and adjusts the flow control valve and therefore controls the flow of the gas.

18. The gas cylinder dispensing system of claim 17 wherein the flow control valve is operatively associated with the control knob and includes a cavity, a disk-shaped orifice plate located within the cavity, and having peripheral, calibrated orifices, each calibrated for a specific flow rate of the gas and operable to be brought into registry with the one end of the second outlet flow passage through rotation of the control knob.

19. The gas cylinder dispensing system of claim 18 wherein:
the valve body having an auxiliary outlet in flow communication with the cavity to discharge the gas;
the auxiliary outlet having a valve biased in a closed position to prevent escape of the gas and configured to engage a gas coupling having a projection to open the valve when the gas coupling engages the auxiliary outlet; and
the disk-shaped orifice plate having an auxiliary region of the disk without a calibrated opening that is operable to be brought in registry with the one end of the second outlet flow passage through rotation of the control knob when the escape of gas is desired from the auxiliary outlet.

20. The gas cylinder dispensing system of claim 19 wherein the gas is selected from the group consisting of oxygen, oxygen with helium, oxygen with nitrogen, oxygen with carbon dioxide, oxygen with nitric oxide, or oxygen with nitrous oxide or any combination thereof.

* * * * *

UNITED STATES PATENT AND TRADEMARK OFFICE
CERTIFICATE OF CORRECTION

PATENT NO. : 7,237,570 B2
APPLICATION NO. : 11/504952
DATED : July 3, 2007
INVENTOR(S) : Gamard et al.

It is certified that error appears in the above-identified patent and that said Letters Patent is hereby corrected as shown below:

Title Page, Item (75) Inventors:

Second Inventor should read --Bryan R. Bielec, Hamburg, NY--.

Signed and Sealed this

Seventh Day of October, 2008

JON W. DUDAS
*Director of the United States Patent and Trademark Office*